Patented July 17, 1951

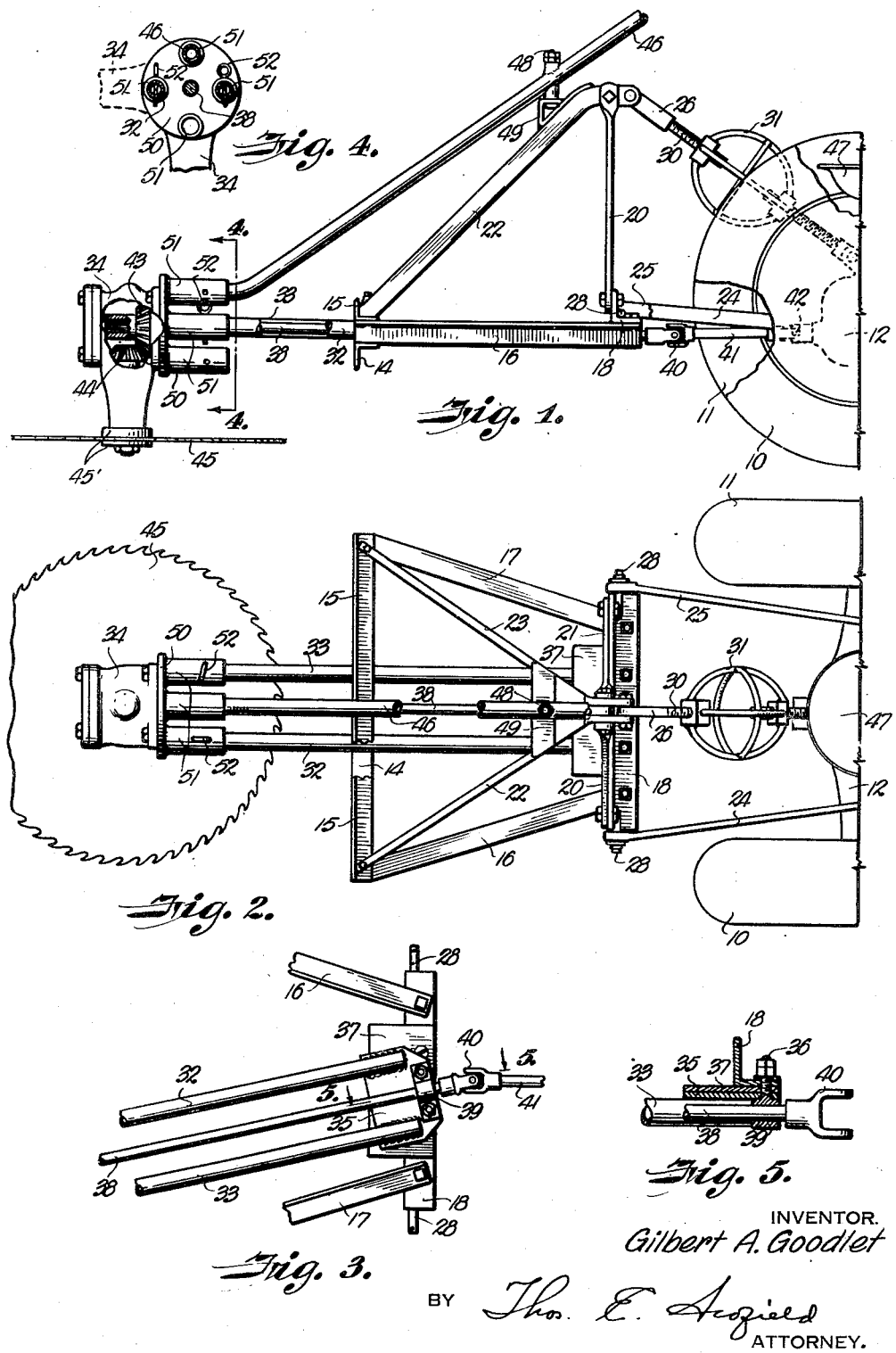

2,560,641

UNITED STATES PATENT OFFICE 2,560,641

TREE-FELLING AND LOG-CUTTING SAW ATTACHMENT FOR TRACTORS

Gilbert A. Goodlet, Windsor, Mo.

Application December 18, 1947, Serial No. 792,356

11 Claims. (Cl. 143—43)

The present invention relates in general to sawing devices and it deals more particularly with power saws mounted on tractors or the like for use in felling trees, sawing logs, clearing heavy underbrush and performing allied outdoor tasks.

The general object of the invention is to provide an improved saw of this character, which has great flexibility of use and which is reliable, trouble free and very easily operated.

Another object is to provide a saw attachment for tractors that is comparatively simple and economical to fabricate.

A further object lies in the provision of a saw which is mounted on the rear of a tractor within the view of the operator as he sits on the tractor's seat. Another object is to provide a saw which may be raised or lowered at will, which at any elevation may be made horizontal or inclined and which can be moved laterally or longitudinally at any elevation, all of these functions being controlled by the operator without leaving the seat of the tractor.

Still another object of the invention is to provide an arrangement whereby the saw blade can be operated while it is either in a horizontal plane or a vertical plane, and can be changed simply and easily from one to the other.

Other objects of the invention together with the structural features thereof, will appear in the course of the following description.

In the accompanying drawings which form a part of the specification and are to be read in conjunction therewith, and in which like reference numerals are employed to indicate like parts of the various views, Fig. 1 is a side elevational view of my saw attachment, part being cut away for purposes of illustration, Fig. 2 is a plan view of the saw attachment, Fig. 3 is an enlarged detail view showing the under side of the hinge for the saw carriage, Fig. 4 is a cross sectional view taken along the line 4—4 of Fig. 1 in the direction of the arrows, and Fig. 5 is a cross sectional view taken along the line 5—5 of Fig. 3 in the direction of the arrows.

Referring more particularly to the drawings, the reference numerals 10 and 11 identify the rear wheels of a conventional tractor 12. Behind the tractor is a rigid frame comprising transverse opposed angle members 14 and 15 disposed horizontally one above the other in vertically spaced relation; these are welded to the top and bottom respectively of side rails 16 and 17 at one end thereof, the side rails converging forwardly and having their forward ends bolted to a horizontal cross piece 18.

Cross piece 18 also is an angle member and at its opposite ends has braces 20 and 21 bolted to its vertical flange. The braces converge upwardly and at a point above the center of the horizontal cross piece they are bolted or welded to struts 22 and 23 which extend diagonally downward and rearwardly to the opposite ends of the upper transverse member 15 where they in turn are bolted or welded.

It will be seen from the foregoing that elements 14 to 23, inclusive, form a rigid open framework of very substantial character, the bottom being generally trapezoidal in plan and the forward end being generally triangular in elevation. The frame is carried by the tractor on rearwardly extending arms 24 and 25 and link 26 all of which are hinged to the tractor frame at their forward extremities. The arms 24 and 25 comprise conventional "lift arms" of the type having hydraulic rams or other mechanism connected to them for the purpose of raising of lowering the rear ends of the two arms in unison; such mechanism is well-known and since its structure forms no part of the present invention it has not been detailed in the drawings.

As shown the rear ends of the two lift arms are pivotally connected to trunnion pins 28 which are welded to cross piece 18. Link 26 is hingedly connected between forward extensions on the struts 22 and 23 and it will be noted that this link includes a shank 30 threaded to receive a turnbuckle 31 whereby the length of the link can be adjusted. By means of the lift arms the rigid frame can be elevated or lowered as a unit, and at any selected height above the ground it can be tilted about trunnions 28, if desired, by means of turnbuckle 31. For most work it is desirable to keep the frame in such a position that side rails 16 and 17 are approximately horizontal, as illustrated, but to meet special situations they can easily be inclined upwardly or downwardly with respect to their forward ends by making an appropriate adjustment of the length of link 26 by turnbuckle 31.

The vertically spaced angle members 14 and 15 form a narrow horizontal guideway for a pair of parallel beams or pipes 32 and 33, the rear end of the pipes being fastened to the gear housing 34 while their forward ends are welded to a plate 35. The latter plate is pivoted at 36 on the under side of a second plate 37 which in turn is bolted to the cross piece 18.

Between pipes 32 and 33 is a shaft 38 whose forward end is journaled in a bearing 39 carried on plate 35. This shaft is connected by a universal joint 40 to a shaft 41 which in turn is connected by a universal joint 42 to the power takeoff of the tractor. The rear end of shaft 38 enters the housing 34 and has a bevelled gear 43 splined thereto; this meshes with pinion 44 on a downwardly extending shaft thereby to drive the disk saw 45 affixed to the latter shaft by means of conventional clamping disks or hubs 45', It will be evident from the foregoing that while the saw is being driven from the power takeoff of the tractor through the medium of shafts 38 and 41 and gears 43 and 44, it can be moved along a horizontal path by swinging the entire saw carriage (i. e., elements 32, 33, 34 and 35) about pivot 36. For the purpose of controlling this movement there is provided a lever 46 which has one end connected to the housing 34 and the other end extending forwardly and upwardly to a point within the convenient reach of the operator as he sits in the seat or saddle 47 of the tractor. Lever 46 is pivoted at 48, the pivot pin being carried on a bracket 49 welded to the struts 22 and 23.

The manner in which my saw is used for felling trees or the like will be quite obvious. The tractor first is backed up so that disk 45 is beside the trunk and the height of the disk above the ground as well as its pitch with respect to the ground are adjusted by lift arms 24 and 25 and link 26 as hereinbefore described. Then with the saw disk rotating the operator advances the blade edgewise toward and into the trunk by applying lateral pressure to the upper end of lever 46. All of the necessary operations can be performed without leaving the tractor seat. In addition to controlling the lateral movement of the saw it may be moved longitudinally, if desired simply by causing the tractor to move slowly forward or backward. Small trees and even trees of moderate size can be felled rapidly in this fashion; and the arrangement makes it possible to clear underbrush not only with great ease but much more quickly than has been possible heretofore.

Attention is directed now to the mode of attaching the saw head, including gear housing 34, to the rear end of the saw carriage. It will be observed that the gear housing is bolted to a circular plate 50, the plate containing a central aperture through which shaft 38 extends into the housing. Welded to the forward face of the plate are four hollow sleeves 51 having inside diameters conforming with the outside diameters of pipes 32, 33 and 46. The sleeves are parallel to one another and arranged in diametrically opposed pairs, the horizontally aligned pair fitting snugly over pipes 32 and 33 and being fastened thereto by pins 52 which extend through registering holes in the pipes and sleeves. Pipe 46 fits into the uppermost sleeve but, not being pinned thereto, always is free to slide axially within the sleeve.

The foregoing arrangement permits the plane of the saw blade 45 to be changed easily from horizontal to vertical. In order to make the change it is only necessary to withdraw pins 52 and draw the housing 34 rearwardly until sleeves 51 are clear of pipes 32, 33 and 46; then the housing is rotated 90° about the axis of shaft 38 and advanced back onto the pipes, after which the pins are replaced in the then horizontally aligned sleeves. As changed the neck of the housing 34 extends laterally as shown by dotted lines in Fig. 4 instead of downwardly, and disk 45 therefore is disposed in a vertical plane.

Mounted in this fashion the saw is useful, for example, in cutting up felled trees into logs, cutting limbs therefrom and the like. In such use the tractor can be maintained stationary and the saw advanced by operating the lift arms 24 and 25 to lower the rotating blade into the wood from an elevated position; alternatively the blade can initially be made level with the piece to be cut and then advanced into the piece by slowly backing up the tractor along the path parallel to the blade.

Whether the saw is employed horizontally or vertically, it always is within the sight of the operator as he sits at the controls of the tractor and all operations both of the tractor and of the saw can be controlled without leaving the seat.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof it is to be understood that all matters herein set forth or shown in the accompanying drawings is to be interpreted as illustrative and not in a limiting sense.

Having thus described my invention, I claim:

1. A tractor saw attachment, comprising a rigid frame detachably mounted on the rear of the tractor, said frame having laterally spaced side rails connected at their forward end by a cross piece and connected at their rear end by a pair of vertically spaced horizontal cross pieces, uprights on the forward end of the frame and diagonal struts connecting the upper end of the uprights to the rear of the frame, lift arms on the tractor having their rear ends pivoted to the forward cross piece for raising and lowering same, a tension link extending from the upper end of the uprights to the tractor, said link including means for adjusting the length of the link to rock the frame about an axis substantially coinciding with said forward cross piece, an elongated carriage having its forward end pivoted to the forward cross piece, said carriage extending rearwardly between the vertically spaced rear cross piece and having its free end beyond said frame, a saw on the free end of the carriage, a shaft on the carriage connected to the saw and driven by the tractor motor, and an operating extension member for the carriage extending forward of the frame whereby the free end of the carriage can be moved manually from side to side.

2. A tractor saw attachment, comprising a rigid frame detachably mounted for controlled vertical swinging adjustment on the rear of the tractor, said frame having laterally spaced side rails connected by forward and rear cross pieces, an elongated carriage having its forward end pivoted to the forward cross piece and extending rearwardly across the rear cross piece with its free rear end beyond said frame, a holding coupling between said carriage and said rear cross piece where they cross for holding said carriage to said rear cross piece while permitting the carriage to travel along the rear cross piece as the free end of the carriage swings about said pivot, a saw rotatably mounted on the free end of the carriage, and a shaft on the carriage connected to the saw and driven in all positions of the saw by the tractor motor.

3. A tractor saw attachment as in claim 2 wherein said side rails form stops limiting the lateral movement of said carriage along said rear cross piece.

4. A tractor saw attachment comprising a frame detachably mounted for controlled vertical swinging adjustment on a tractor and carrying a horizontal rail spaced laterally away from the tractor, an elongated carriage disposed across said rail with the end thereof nearest the tractor pivotally connected to said frame, said carriage comprising a pair of laterally spaced beams resting on said rail and having their respective ends rigidly connected to one another, hold down means holding both beams on said rail where they cross, whereby the beams are adapted to slide along said rail as the free end of the carriage swings about said pivot but both beams are maintained on said rail in all positions of lateral travel, a saw rotatably mounted on the frame end of the carriage, and a shaft on the carriage connected to the saw and driven in all positions of the saw by the tractor motor.

5. A tractor saw attachment, comprising a frame detachably mounted for controlled vertical swinging adjustment on the rear of a tractor, an elongated carriage pivoted to the forward portion of said frame and extending rearwardly from said pivot, said frame having a horizontal rail spaced rearwardly of the pivot, said rail slidably supporting the free end of the carriage for lateral movement about said pivot, hold down means holding said carriage on said rail where they cross, thereby to prevent vertical movement of the carriage away from the rail in the event an upward thrust is imposed on the free end of the carriage, a saw rotatably mounted on the carriage at the free end thereof and adapted to move in a horizontal path as said carriage slides on said rail, a shaft on the carriage connected to the saw and driven by the tractor motor, and a lever connected to the carriage having one end extending forward of the frame for controlling said horizontal movement of the saw.

6. An attachment as in claim 5 wherein said elongated carriage comprises a pair of laterally spaced parallel beams having said shaft therebetween.

7. An attachment as in claim 6 having a shaft carrying the saw which shaft is normal to the shaft disposed between said beams, a drive connection between the shafts, a housing for said drive connection, and means for detachably connecting said housing to said beams in either of two positions 90° apart.

8. A tractor saw attachment, comprising a frame detachably mounted for controlled vertical swinging adjustment on the rear of a tractor, mechanism on the tractor operable to raise and lower the frame at will, an elongated carriage pivoted to the forward portion of said frame and extending rearwardly from said pivot, said frame having a horizontal rail spaced rearwardly of the pivot, said rail slidably supporting the free end of the carriage for lateral movement about said pivot, hold down means holding said carriage on said rail where they cross, thereby to prevent vertical movement of the carriage away from the rail in the event an upward thrust is imposed on the free end of the carriage, a saw rotatably mounted on the carriage at the free end thereof and adapted to move in a horizontal path as said carriage slides on said rail, a shaft on the carriage connected to the saw and driven by the tractor motor, and a lever connected to the carriage having one end extending forward of the frame for controlling said horizontal movement of the saw.

9. A tractor saw attachment, comprising a rigid frame detachably mounted for controlled vertical swinging adjustment on the rear of the tractor, said frame having laterally spaced side rails connected at their forward end by a cross piece and connected at their rear end by a pair of upper and lower vertically spaced horizontal cross pieces, an elongated carriage having its forward end pivoted to said forward cross piece, the carriage extending rearwardly between the vertically spaced cross pieces and having its free end beyond said frame, the upper cross piece holding said carriage on the lower cross piece thereby to prevent vertical movement of the carriage away from the lower cross piece in the event an upward thrust is imposed on the free end of the carriage, a saw on the free end of the carriage, a shaft on the carriage connected to the saw and driven by the tractor motor, and an operating extension member for the carriage extending forward from the frame whereby the free end of the carriage can be moved manually from side to side.

10. In a tractor saw attachment, a rigid frame detachably mounted on the rear of the tractor, said frame comprising a pair of laterally spaced side rails connected at their forward end by a cross piece and connected at their rear end by a second cross piece, a superstructure comprising a pair of uprights on the forward end of the frame converging upwardly from opposite sides thereof and a pair of diagonal struts diverging downwardly and rearwardly from the upper portion of said uprights to the rear of said frame, lift arms on the tractor having their rear ends pivoted to the forward end of said frame for raising and lowering same, a tension link extending from the upper portion of said superstructure to the tractor for holding the rear of said frame elevated above the ground, an elongated carriage having its forward end pivoted to the forward cross piece of said frame, said carriage extending rearwardly over the rear cross piece so the latter cross piece supports the rear of said carriage for lateral swinging movement, hold down means holding said carriage on said rear cross piece where they cross, thereby to prevent vertical movement of the carriage away from the rail in the event an upward thrust is imposed on the free end of the carriage, a saw rotatably mounted on the rear of the carriage, and a shaft on the carriage connected to the saw and driven by the tractor motor.

11. A tractor saw attachment as in claim 10 wherein said tension link is adjustable to vary the height of the rear end of said frame above the ground.

GILBERT A. GOODLET.

REFERENCES CITED

The following references are of record in the file of this patent:

UNITED STATES PATENTS

| Number | Name | Date |
| --- | --- | --- |
| 638,553 | Burke | Dec. 5, 1899 |
| 1,447,606 | Seymour | Mar. 6, 1923 |
| 1,830,871 | Domagala | Nov. 10, 1931 |
| 1,832,599 | Wilhelm et al. | Nov. 17, 1931 |
| 2,404,655 | Randall | July 23, 1946 |
| 2,455,840 | Webb | Dec. 7, 1948 |
| 2,461,188 | Stoner | Feb. 8, 1949 |

FOREIGN PATENTS

| Number | Country | Date |
| --- | --- | --- |
| 112,255 | Australia | Dec. 30, 1940 |
| 113,879 | Australia | Sept. 16, 1941 |